United States Patent [19]
Yasui

[11] Patent Number: 5,261,503
[45] Date of Patent: Nov. 16, 1993

[54] ADAPTIVE STEERING CONTROL SYSTEM

[75] Inventor: Yoshiyuki Yasui, Davis, Calif.

[73] Assignee: Aisin Seiki Kabushiki Kaisha, Aichi, Japan

[21] Appl. No.: 807,247

[22] Filed: Dec. 18, 1991

[51] Int. Cl.$^5$ .......................... B67D 5/04; B67D 5/22
[52] U.S. Cl. ................... 180/142; 180/79.1; 364/474.05
[58] Field of Search ............. 180/140, 79.1, 141, 180/197, 142; 364/424.05, 424.01, 424.03

[56] References Cited

U.S. PATENT DOCUMENTS

| | | |
|---|---|---|
| 2,996,137 | 8/1961 | Chu et al. . |
| 3,085,646 | 4/1963 | Paufve . |
| 3,456,752 | 7/1969 | Fonda . |
| 3,498,630 | 3/1970 | Crawford . |
| 3,716,110 | 2/1973 | Fonda . |
| 3,866,706 | 2/1975 | Lincke . |
| 4,049,961 | 9/1977 | Marcy . |
| 4,144,948 | 3/1979 | Sergay . |
| 4,189,955 | 2/1980 | Bishop . |
| 4,418,780 | 12/1983 | Ito et al. . |
| 4,440,254 | 4/1984 | Shibahata et al. . |
| 4,441,572 | 4/1984 | Ito et al. . |
| 4,534,577 | 8/1985 | Howard . |
| 4,540,059 | 9/1985 | Shibahata et al. . |
| 4,546,839 | 10/1985 | Noguchi . |
| 4,549,468 | 10/1985 | Trintignac et al. . |
| 4,634,135 | 1/1987 | Nakata et al. . |
| 4,666,013 | 5/1987 | Shibahata et al. ............ 180/141 |
| 4,705,131 | 11/1987 | Shibahata et al. . |
| 4,705,132 | 11/1987 | Tsuchiya . |
| 4,706,771 | 11/1987 | Kawabe et al. ............ 180/142 |
| 4,708,220 | 11/1987 | Noto et al. . |
| 4,717,175 | 1/1988 | Arai et al. . |
| 4,718,685 | 1/1988 | Kawabe et al. . |
| 4,726,603 | 2/1988 | Sugiyama et al. . |
| 4,735,271 | 4/1988 | Shimizu . |
| 4,741,409 | 5/1988 | Westercamp et al. . |
| 4,747,614 | 5/1988 | Kuroyanagi et al. . |
| 4,758,053 | 7/1988 | Yasuno . |
| 4,759,419 | 7/1988 | Nagae et al. . |

(List continued on next page.)

FOREIGN PATENT DOCUMENTS

| | | |
|---|---|---|
| 0054776 | 6/1982 | European Pat. Off. . |
| 0089631 | 9/1983 | European Pat. Off. . |
| 0150303 | 8/1985 | European Pat. Off. . |
| 0150856 | 8/1985 | European Pat. Off. . |
| 0282041 | 9/1988 | European Pat. Off. . |
| 0350020 | 1/1990 | European Pat. Off. . |
| 0351146 | 1/1990 | European Pat. Off. . |
| 0352759 | 1/1990 | European Pat. Off. . |
| 0379430 | 7/1990 | European Pat. Off. . |
| 3729898 | 3/1989 | Fed. Rep. of Germany . |
| 3811312 | 10/1989 | Fed. Rep. of Germany . |
| 2227986 | 11/1974 | France . |
| 2636288 | 3/1990 | France . |
| 1411829 | 10/1975 | United Kingdom . |
| 2203395 | 10/1988 | United Kingdom . |

OTHER PUBLICATIONS

"Adaptive Steering", Kasselmann & Keranen, Bendix Technical Journal, Autumn 1969, pp. 27–35.

*Primary Examiner*—Margaret A. Focarino
*Assistant Examiner*—Florian Zeender
*Attorney, Agent, or Firm*—Banner, Birch, McKie & Beckett

[57] ABSTRACT

The steering stability of a moving vehicle is maintained by measuring an actual yaw rate of the vehicle and determining a desired yaw rate of the vehicle and producing an output signal in response to a comparison of the actual and desired yaw rates. The steering angle of steerable wheels of the vehicle is controlled in response to the output signal in a manner tending to substantially conform the actual yaw rate to the desired yaw rate, thereby maintaining vehicle stability. The steerable wheels are steered by a steering wheel, and are independently steered by a motor in response to the output signal. The amount of steering provided by the motor is controlled in dependence upon an estimated frictional coefficient between the vehicle and the road, or upon detected values of the environmental temperature and precipitation.

12 Claims, 11 Drawing Sheets

U.S. PATENT DOCUMENTS

| | | |
|---|---|---|
| 4,768,602 | 9/1988 | Inoue et al. . |
| 4,771,846 | 9/1988 | Venable et al. . |
| 4,773,012 | 9/1988 | Ito et al. . |
| 4,793,431 | 12/1988 | Eto et al. . |
| 4,796,720 | 1/1989 | Bauer . |
| 4,800,974 | 1/1989 | Wand et al. . |
| 4,823,898 | 4/1989 | Ogura et al. . |
| 4,828,063 | 5/1989 | Ogura et al. . |
| 4,830,127 | 5/1989 | Ito et al. . |
| 4,830,131 | 5/1989 | Miyoshi et al. . |
| 4,858,713 | 8/1989 | Kawakami et al. . |
| 4,865,146 | 9/1989 | Ohe .................................. 180/140 X |
| 4,878,557 | 11/1989 | Shibahata et al. ................... 180/140 |
| 4,881,749 | 11/1989 | Bausch . |
| 4,902,032 | 2/1990 | Krehan et al. . |
| 4,921,061 | 5/1990 | Asano . |
| 4,941,097 | 7/1990 | Karnopp et al. ................ 364/424.05 |
| 4,941,542 | 7/1990 | Tomoda et al. . |
| 4,953,654 | 9/1990 | Imaseki et al. ....................... 180/197 |
| 4,967,865 | 11/1990 | Schindler ............................ 180/79.1 |
| 4,970,646 | 11/1990 | Sugasawa et al. . |
| 4,998,593 | 3/1991 | Karnopp et al. ................ 180/141 X |
| 5,048,627 | 9/1991 | Eguchi et al. . |
| 5,097,917 | 3/1992 | Serizawa et al. ................... 180/79.1 |
| 5,141,069 | 8/1992 | Yasui . |
| 5,156,229 | 10/1992 | Yasui et al. . |
| 5,159,553 | 10/1992 | Karnopp et al. . |

| ROAD CONDITION | DRY | WET | SNOW |
|---|---|---|---|
| DESIRED CONTROL ANGLE ($\delta_c$) | SMALL | MEDIUM | LARGE |
| RATE OF CHANGE OF CONTROL ANGLE ($\delta'_c$) | FAST (LARGE VALUE) | MEDIUM (MEDIUM VALUE) | SLOW (SMALL VALUE) |

FIG. 17

ADAPTIVE STEERING CONTROL SYSTEM

BACKGROUND OF THE INVENTION

The present invention generally relates to an apparatus for steering a vehicle.

During vehicle motion, such as cornering, for example, vehicle handling dynamics are affected by various parameters such as road conditions, tire characteristics, weight distribution, braking, accelerating, and the like, which can lead to oversteer or understeer conditions. In an effort to deal with this problem and maintain vehicle handling dynamics constant, there have been heretofore proposed complex suspension link systems, drive train arrangements, and braking systems. However, such proposed systems involve relatively numerous parts which undesirably increase the complexity and size of the system.

SUMMARY OF THE INVENTION

The present invention is directed to a method and apparatus for maintaining steering stability of a moving vehicle. A detecting element detects values for the vehicle speed, vehicle yaw rate, vehicle lateral acceleration, steering wheel angle, and steering angle of the steerable wheels. A control element estimates a friction coefficient between the vehicle and the road surface based upon the detected yaw rate, lateral acceleration and steering angle, and calculates a desired yaw rate for the vehicle based on the detected vehicle speed and steering wheel angle. The control element also calculates the difference between the desired yaw rate and the detected yaw rate, and determines the proper amount of additional steering control angle for the steerable wheels of the vehicle and the speed with which the control angle is to be implemented based on the vehicle speed, estimated frictional coefficient and the difference between the desired yaw rate and the detected yaw rate so as to cause the desired yaw rate to become equal to the detected yaw rate. The control element outputs a signal indicative of the proper control angle and control rate.

BRIEF DESCRIPTION OF THE DRAWINGS

The objects and advantages of the invention will become apparent from the following detailed description of preferred embodiments thereof in connection with the accompanying drawings in which like numerals designate like elements, and in which.

DETAILED DESCRIPTION

Figure 1:
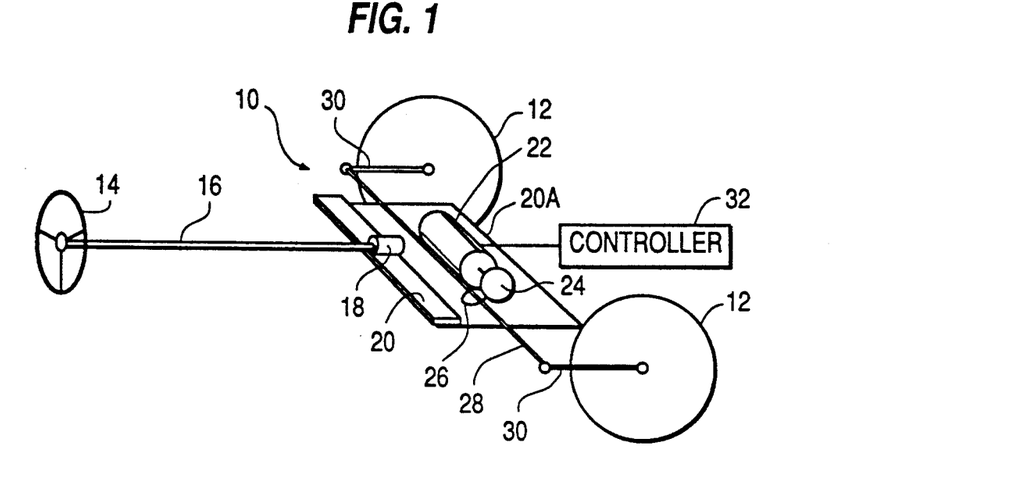
FIG. 1 is a schematic perspective view of a first embodiment of a steering mechanism for the steerable wheels of a vehicle.

Depicted in FIG. 1 is a steering system 10 for a vehicle which includes a pair of steerable wheels 12 operably connected to a steering wheel 14 by means of a steering mechanism. The steering mechanism is of the rack and pinion type wherein the steering shaft 16 carries a pinion 18 which meshes with teeth on a reciprocable rack 20. Fixed on an extension 20A of the rack is an electric motor housing 22. The motor includes an output shaft which drives an output gear 24. The output gear meshes with a helical thread of a nut 26 which is fixed to a tie rod 28. The ends of the tie rod 28 are connected to a pair of steering arms 30 which transmit steering motion to the steerable wheels 12.

Thus, in practice, the shaft 16 and pinion produce linear movement of the rack 20 and rack extension 20A, and such linear movement is transmitted to the motor housing and output gear 24. The latter produces a linear movement of the nut 26 due to the meshed coupling between the output gear 24 and the nut 26. Linear movement of the nut 26 is transmitted directly to the tie rod 28. In this fashion, the orientation of the wheels 12 can be varied by turning the steering wheel.

In order to prevent excessive oversteer or understeer, that is, to provide adaptive steering control to the vehicle, the present invention enables the wheel orientation to be adjusted independently of the position of the steering wheel by actuation of the motor 22 to produce rotation of the output gear 24 and a resulting linear movement of the nut 26 and tie rod 28. Thus, stability augmentation or adaptive steering control may be provided in order to ensure that the vehicle travels on the desired path.

Actuation of the motor 22 is produced by electrical signals from a controller 32 which utilizes signals dependent upon steering angle and vehicle speed to determine a desired yaw rate, and compares that desired yaw rate to an actual yaw rate to control the tire angle. Yaw rate can be defined as the rate of rotation of the vehicle about a vertical axis.

Figure 3:
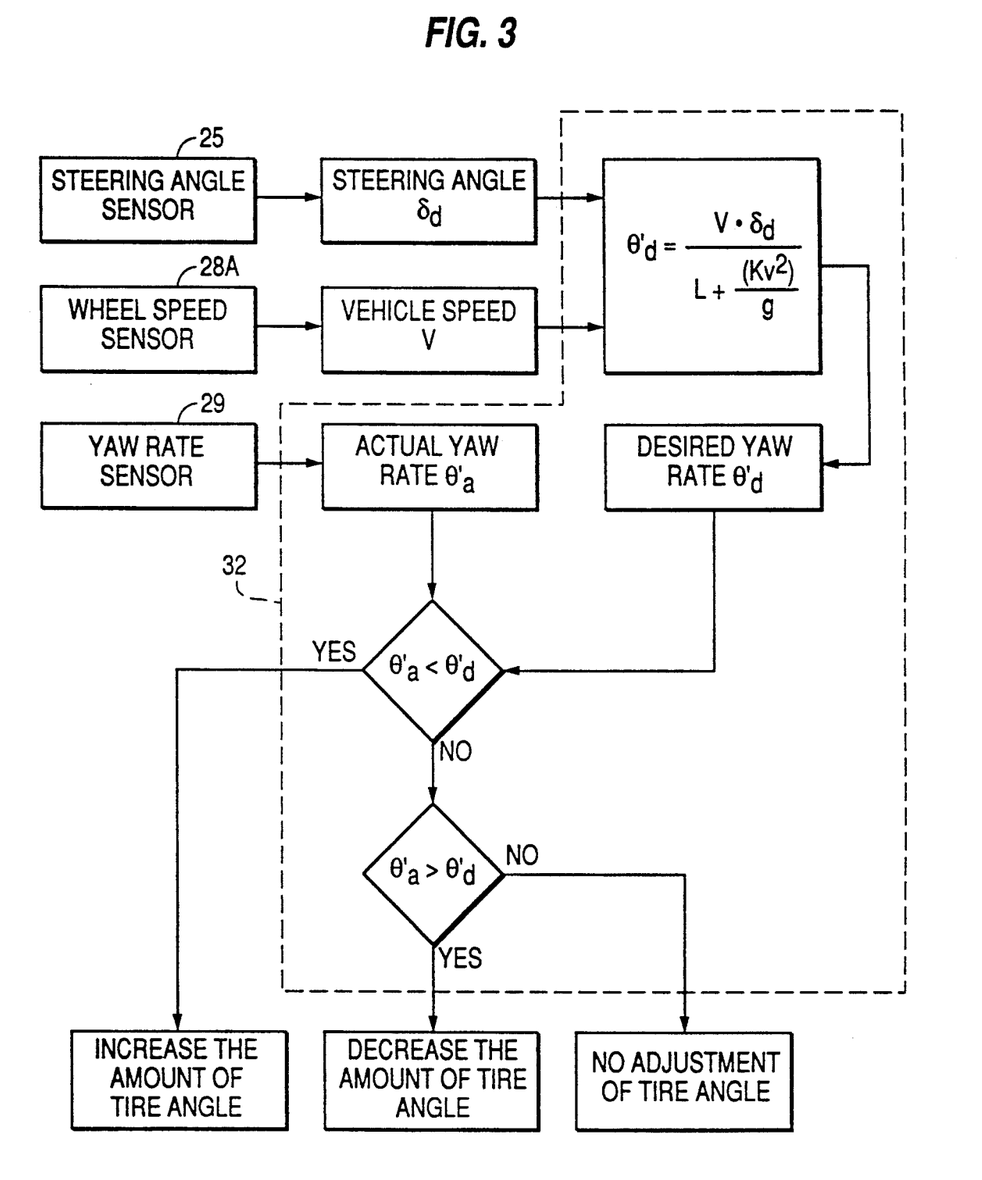
FIG. 3 is a flowchart for the system shown in FIG. 2.

Referring to FIG. 3, steering wheel angle signal $\delta_d$ is provided by a conventional steering wheel angle sensor 25 which is operably connected to the steering shaft 16 of the vehicle. The vehicle speed signal V is provided by conventional wheel speed sensors 28A operably connected to all ground wheels of the vehicle. If the wheel speeds are different, the controller will obtain an average thereof. An actual yaw rate $\theta'_a$ is measured by a conventional yaw rate sensor such as a gyro 29.

A desired yaw rate ($\theta'_d$) is calculated by the controller in accordance with the relationship:

$$\theta'_d = \frac{V \cdot \delta_d}{L + \frac{(KV^2)}{g}}$$

where $\theta'_3$ is the desired yaw rate, L is the length of the wheel base of the vehicle (i.e., the distance between the front and rear axles), g is acceleration due to gravity, $\delta_d$ is the steering wheel angle, V is vehicle sped, and K is a constant greater than 0 and no greater than 1 degree in order to achieve a neutral or slight understeer condition.

After determining the desired yaw rate $\theta'_d$ in the above manner, the controller compares the desired yaw rate value with the actual yaw rate $\theta'_a$. When $\theta'_a = \theta'_d$ no steering adjustment is necessary; when $\theta'_a < \theta'_d$, an understeer condition exists, requiring that the amount of tire angle be increased; and when $\theta'_a > \theta'_d$, an oversteer condition exists requiring that the amount of tire angle be decreased. The direction in which the output gear 24 is rotated is dependent upon which of the values $\theta'_a$ and $\theta'_d$ is larger, and the amount of rotation of the output gear 24 is dependent upon the magnitude of the difference between the values $\theta'_a$ and $\theta'_d$. Rotation of the output gear 24 continues until the controller observes that $\theta'_a = \theta'_d$. Thus, adaptive steering control is provided to correct understeer or oversteer.

Figure 4:
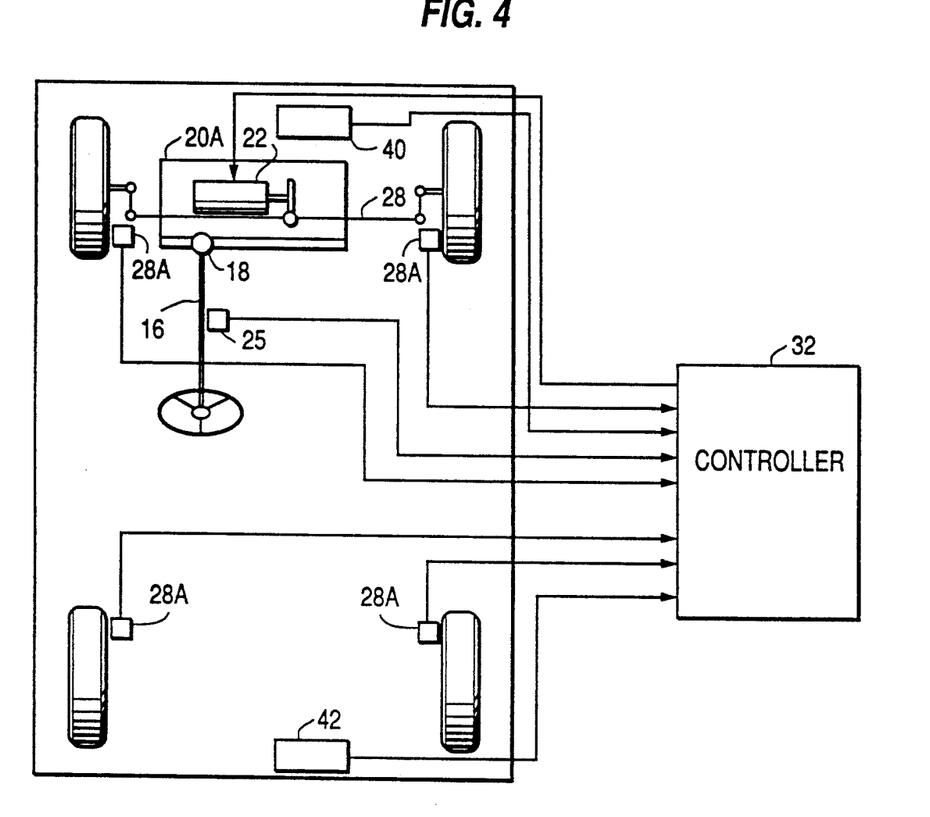
FIG. 4 is a schematic diagram of a second embodiment of a system for controlling the steering mechanism.
Figure 5:
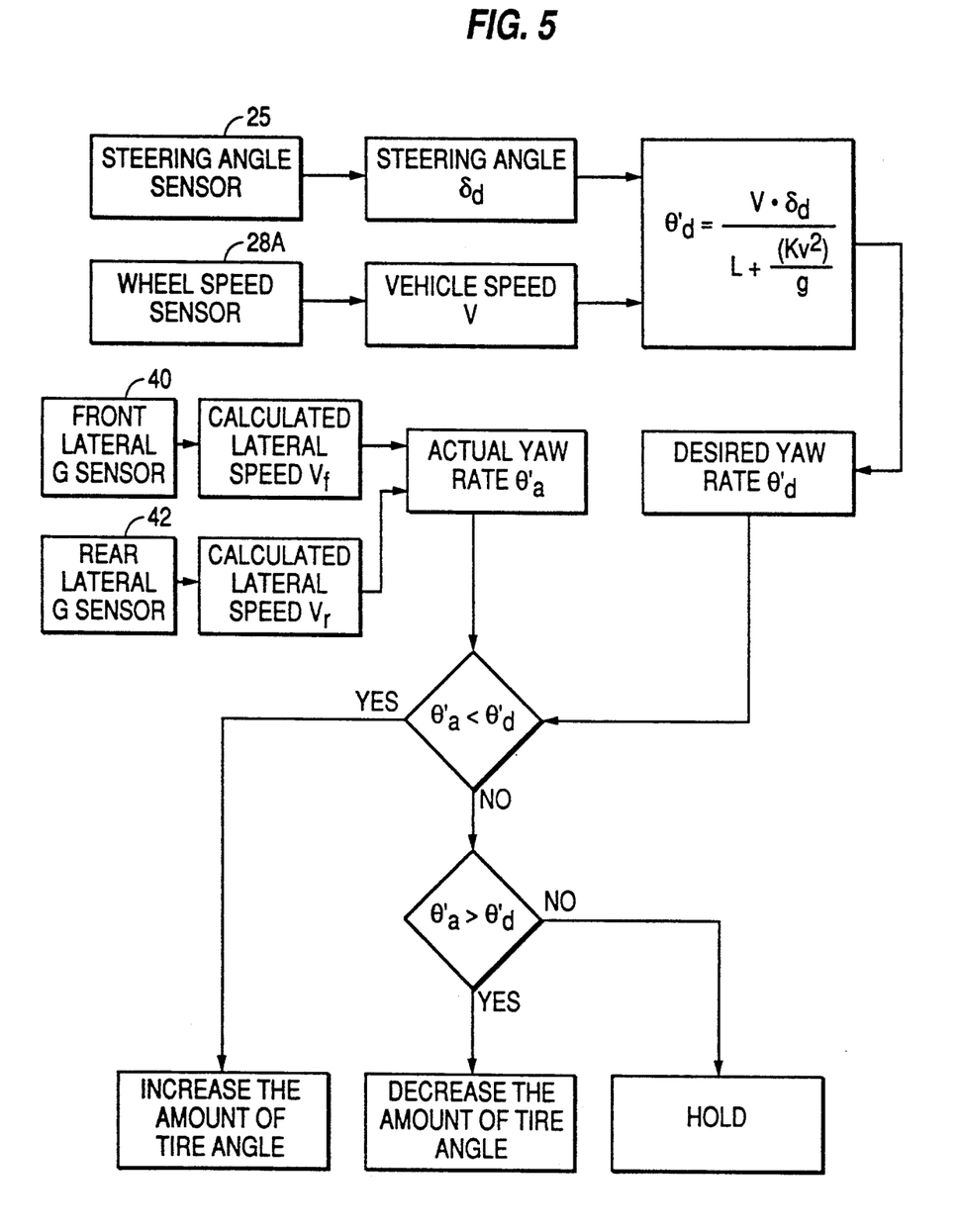
FIG. 5 is a flow chart for the system shown in FIG. 4.

In FIGS. 4 and 5, another preferred embodiment of the control aspect is depicted wherein an alternative way of determining actual yaw rate is employed. That is, in lieu of yaw rate sensor there are employed conventional front and rear lateral acceleration (G-force) sensors 40, 42. The measured front and rear lateral accelerations are converted to front and rear lateral velocity values $V_f$, $V_r$, respectively, by the controller, enabling the actual yaw rate $\theta'_a$ to be determined by the following relationship:

$$\theta'_a = \frac{V_f - V_r}{N}$$

where N is the distance between the front and rear sensors 40, 42.

Figure 6:
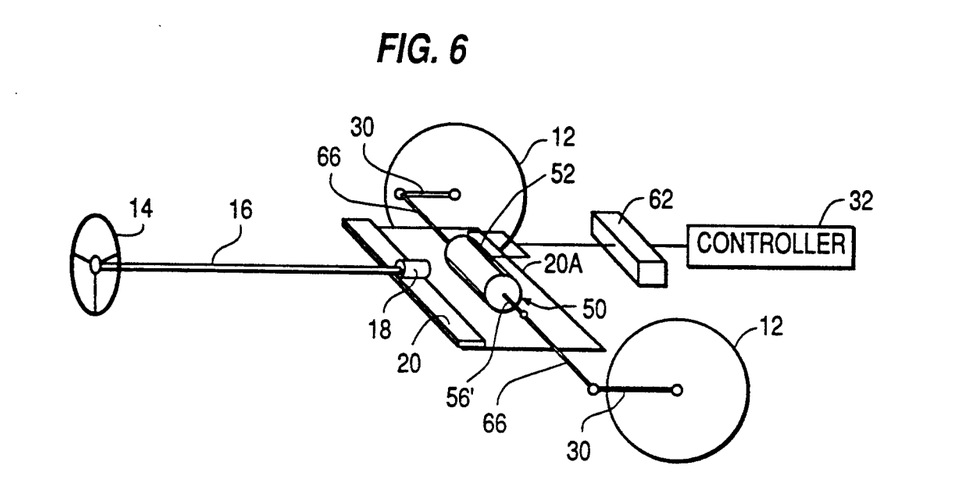
FIG. 6 is a schematic perspective view of a second embodiment of a steering mechanism for steering the steerable wheels.
Figure 7:
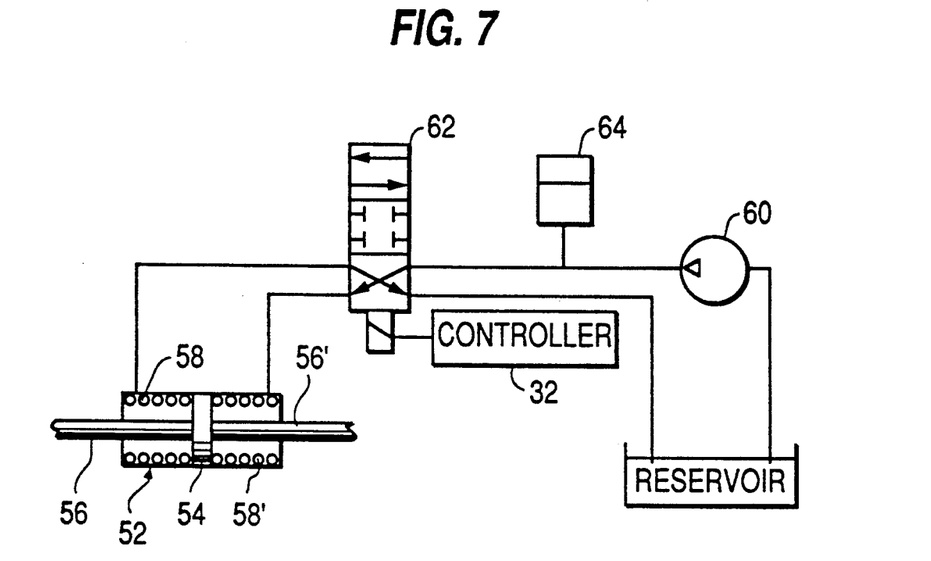
FIG. 7 is a schematic representation of a portion of the steering mechanism of FIG. 6.

In FIGS. 6 and 7, a second preferred embodiment of a steering mechanism of the invention is depicted wherein the electric motor has been replaced by a pressurized fluid motor 50. The fluid motor comprises a fluid cylinder 52 in which is disposed a reciprocable piston 54. A pair of piston rods 56, 56' are connected to opposite sides of the piston 54 and project from opposite ends of the cylinder. Alternatively, a single steering rod having a piston integrally formed thereon could be used in place of the pair of piston rods and piston, as shown with reference to FIG. 8. A pair of springs 58, 58' disposed within the cylinder bias the piston 54 to a central location within the cylinder 52. A fluid pump 60, operated by the engine, supplies pressurized fluid, for example, oil, to a three-way solenoid valve 62, the position of which is determined by a signal from the controller 32. An accumulator 64 can be provided in the fluid line between the pump 60 and the valve 72 to dampen oscillations in fluid pressure.

In operation, steering of the wheels 12 is effected by the steering wheel 14 and the rack and pinion coupling 18, 20. Linear movement of the rack 20 is transmitted to the cylinder 52 which is fixedly mounted on the rack extension 20A. Linear movement of the cylinder is transmitted to the tie rods 66 which are connected to outer ends of the piston rods 56, 56'. In the event that the controller 32 detects an understeer or oversteer condition, the electrically actuable solenoid valve 62 is actuated by an electric output signal from the controller 32 to displace the piston in either of two directions to turn the wheels 12 independently of the position of the steering wheel, thereby making the needed correction in tire angle.

Figure 8:
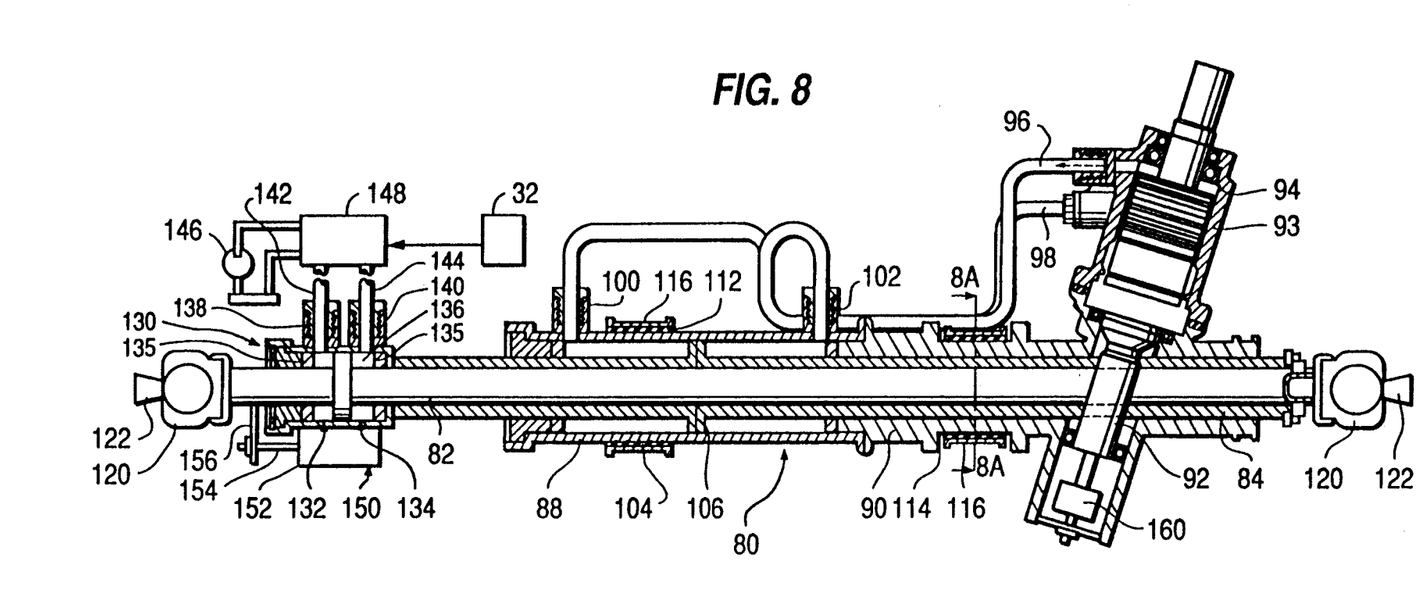
FIG. 8 is a longitudinal sectional view through a mechanism operating in accordance with the embodiment disclosed in connection with FIG. 6.
Figure 8A:
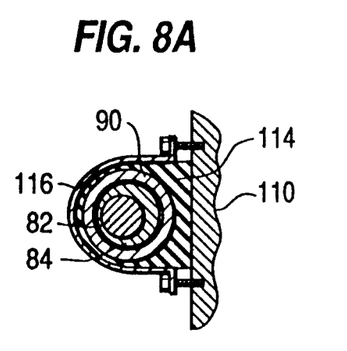
FIG. 8A is a cross-sectional view taken along the line 8A—8A of FIG. 8.
Figure 8B:
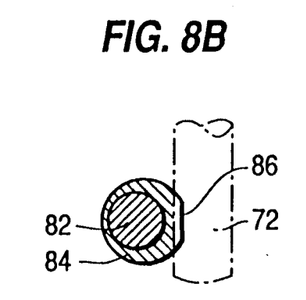
FIG. 8B is a cross-sectional view depicting the manner in which a steering pinion engages a rack.
Figure 9:
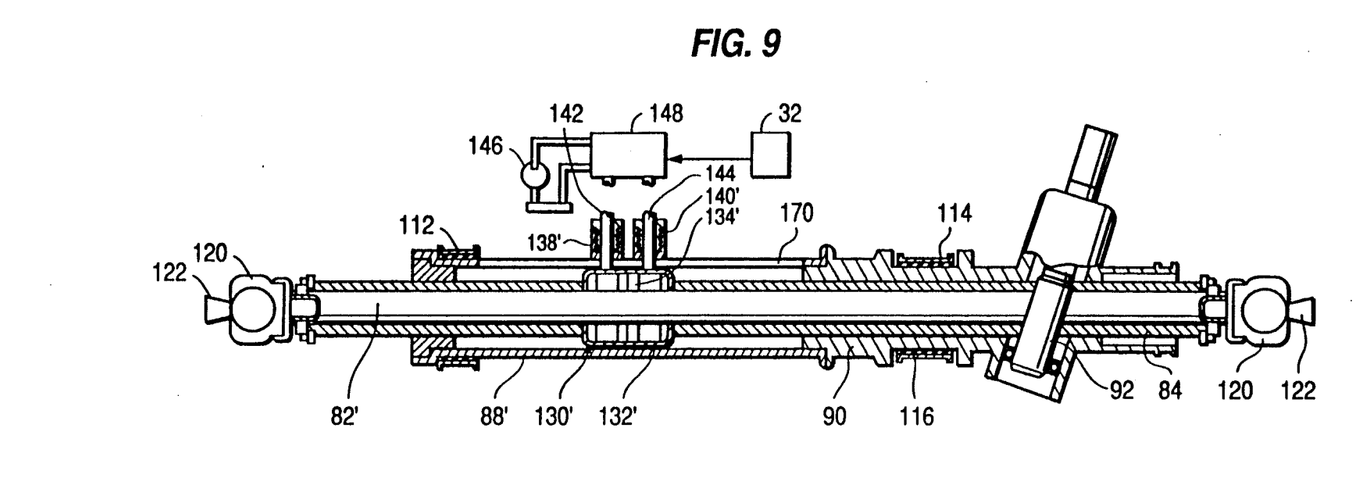
FIG. 9 is a longitudinal sectional view through another mechanism operating in accordance with the embodiment disclosed in connection with FIG. 6.
Figure 10:
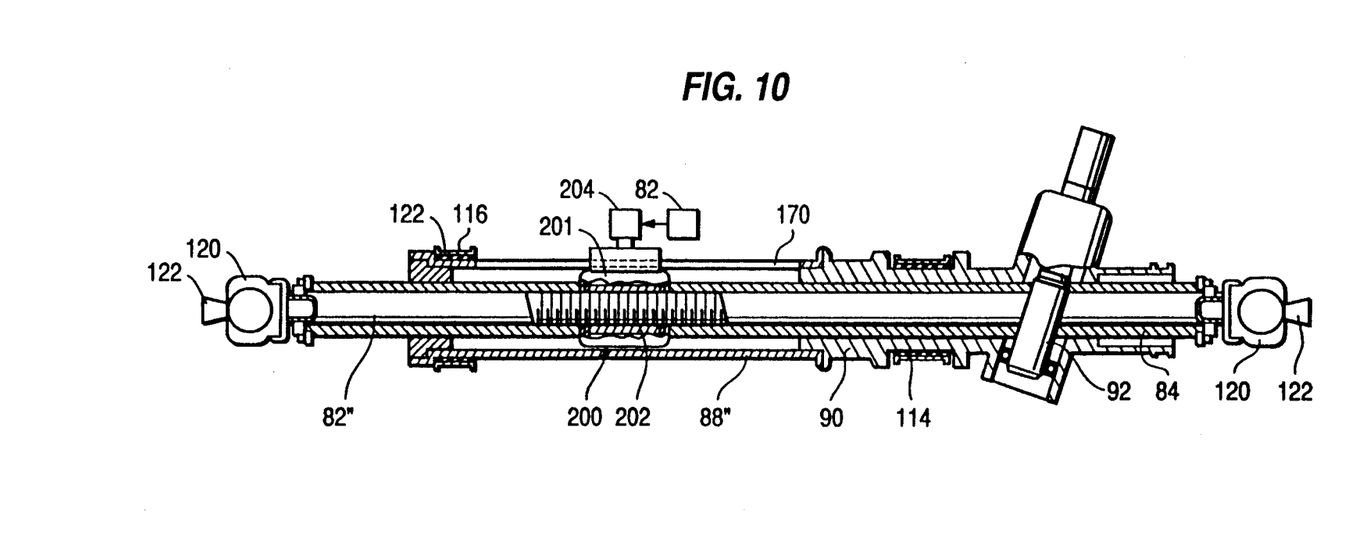
FIG. 10 is a longitudinal sectional view through a mechanism operating in accordance with the embodiment disclosed in connection with FIG. 1.

Depicted in FIGS. 8-10 are a number of preferred mechanisms which operate in accordance with the system disclosed in connection with FIGS. 6 and 7. FIGS. 8, 8A and 8B depict one of those mechanisms 80 in which a steering rod 82 is axially slidably mounted in a rack 84 in the form of a hollow cylinder. The rack includes teeth 86 formed on a portion of its outer circumference (see FIG. 8B). The rack 84 is eccentrically arranged relative to the tie or steering rod 82, with the teeth 86 formed on the thicker portion of the rack 84 to thus properly balance the device. The rack 84 is axially slidably mounted in a housing formed by axially aligned power steering housing 88 and steering gear housing 90.

Mounted in steering gear housing 90 is a conventional pinion 92 which is mechanically coupled to the steering shaft. Pinion 92 meshes with the teeth of the rack (see FIG. 8B). Steering gear housing 90 includes power steering valve housing 94 from which a pair of fluid lines 96, 98 extend. Those lines are connected to fittings 100, 102 carried by power steering housing 88 to communicate with power steering chamber 104 on opposite sides of power steering piston 106 disposed in chamber 104. Connected to pinion 92 is a conventional power steering control valve 93 which controls the flow of power steering fluid from a pump (not shown) to a respective one of the lines 96, 98, depending upon the direction in which the steering wheel is turned.

The housing assembly 80 is mounted to a rigid frame 110 of the vehicle by means of a pair of elastic grommets 112, 114. Each grommet is in the form of a hollow cylinder through which a respective part of the housing extends. The grommet 112 receives the power steering housing 88, and the other grommet 114 receives the steering gear housing 90. Each grommet is bolted to the frame 110 by means of a bracket 116. Vibrations of the housing are dampened by the grommets.

Secured to opposite ends of steering rod 82 are ball joints 120 which are attached to the steerable wheels by steering arms 122. Axial displacement of the tie rod 82 in either direction produces a steering of the steerable wheels. The axial displacement of tie rod 82 can be produced by steering pinion 92 which effects an axial displacement of rack 84. Axial displacement of the rack 84 is transmitted to tie rod 82 by a mechanism which includes a fluid motor 130. Fluid motor 130 includes a control cylinder 132 connected to rack 84 and piston 134 integrally formed with rod 82. Piston 134 is axially slidable within chamber 136 formed by control cylinder 132 and oil seals 135. Communicating with chamber 136 on opposite sides of piston 134 are fittings 138, 140 which are coupled to flexible fluid lines 142, 144, respectively. Lines 142, 144 are arranged to receive pressurized fluid from a pump 146 after the fluid passes through valve 148, for example, a tri-positional solenoid valve. Valve 148 is actuated to divert pressurized fluid to one of, or neither of, lines 142 or 144 by controller 32 in the manner discussed earlier herein.

When neither of lines 142 or 144 is in communication with pump 146, fluid remaining in the chamber 136 on opposite sides of piston 134 is able to transmit axial force from control cylinder 132 to piston 134. Thus, axial movement of rack 84 produced by main steering mechanism 92, and by the power steering assembly is transmitted to tie rod 82 through control cylinder 132, the fluid in chamber 136, and piston 134. In other words, fluid in control cylinder 132 prevents tie rod 82 from moving relative to rack 84 when pump 146 is not linked to chamber 136.

In the event that controller 32 determines that the orientation of the steerable wheels should be adjusted in order to prevent excessive oversteer or understeer as discussed with respect to FIGS. 3-5, valve 184 is actuated to direct pressurized fluid from pump 146 to one side of piston 134. As a result, piston 134 is axially displaced relative to control cylinder 132, causing lateral movement of rod 82 with respect to rack 84 and steering the steerable wheels independently of the movement of rack 94.

In order to measure the amount of displacement of tie rod 82 relative to rack 84, which represents the amount by which the tie rod is displaced by controller 32, a potentiometer 150 is connected to the tie rod. Potentiometer 150 is of the linear type and includes a housing 152 mounted to control cylinder 132 for movement therewith, and a rod 154 connected to tie rod 82 by means of a bracket 156. Rod 154 is displaced relative to housing 152 in response to relative displacement between the tie rod and the rack, whereupon potentiometer 150 generates a signal which is fed back to the controller.

In order to measure the amount of displacement of rack 84, thereby providing an indication of the orientation of the steerable wheels, a rotary potentiometer 160 is coupled to pinion 92. A signal generated by rotary potentiometer 160 is fed back to controller 32. This signal also is indicative of the steering wheel or driver input angle $\delta_d$, since it measures the degree of rotation of pinion 62 and thus the steering wheel. In the above discussed embodiments, steering wheel or driver input angle $\delta_d$, which is determined directly by sensor 25, is used in calculating the desired yaw rate. However, by obtaining the sum of the displacement of rack 84 with respect to housing 90 and the displacement of tie rod 82 with respect to rack 84, the overall displacement of tie rod 82 may be obtained. The overall displacement of the tie rod is indicative of the angular displacement of the steered wheels, that is, the actual steering angle $\delta_f$. Both driver input angle $\delta_d$ and the actual steering angle $\delta_f$ are used in the embodiments of FIGS. 14-18, which are discussed below.

A preferred mechanism depicted in FIG. 9 is similar to that depicted in FIG. 8, except that no power steering mechanism is provided, and control cylinder 132' of motor 130' is mounted intermediate the axial ends of rack 84. Fittings 138' and 140' are arranged for displacement within a slot 170 formed in the housing part 88'. Linear and rotary potentiometers are not depicted, but would be provided. The embodiment according to FIG. 9 operates in the same manner as that disclosed in connection with FIG. 8, the steering forces being transmitted through the rack 84 and the piston 134' en route to the steering arms.

A preferred mechanism depicted in FIG. 10 is similar to that depicted in FIG. 9, except that in lieu of a fluid motor 130', there is provided an electric motor 200. The electric motor 200 includes a housing 201 connected to the rack 84, and an output element in the form of an internally threaded rotary nut 202 which is rotated when an electric power source 204 energizes a stator of the motor 200 in response to a signal from the controller 32. The nut 202 meshes with external threading on the tie rod 82" in order to axially displace the tie rod relative to the rack 84. Although not depicted, potentiometers for measuring the displacement of the rack, and relative displacement between the tie rod and rack would be provided. Steering forces from the pinion 92 are transmitted through the rack 84 and the electric motor output nut 202 en route to the steering arms.

Figure 11:
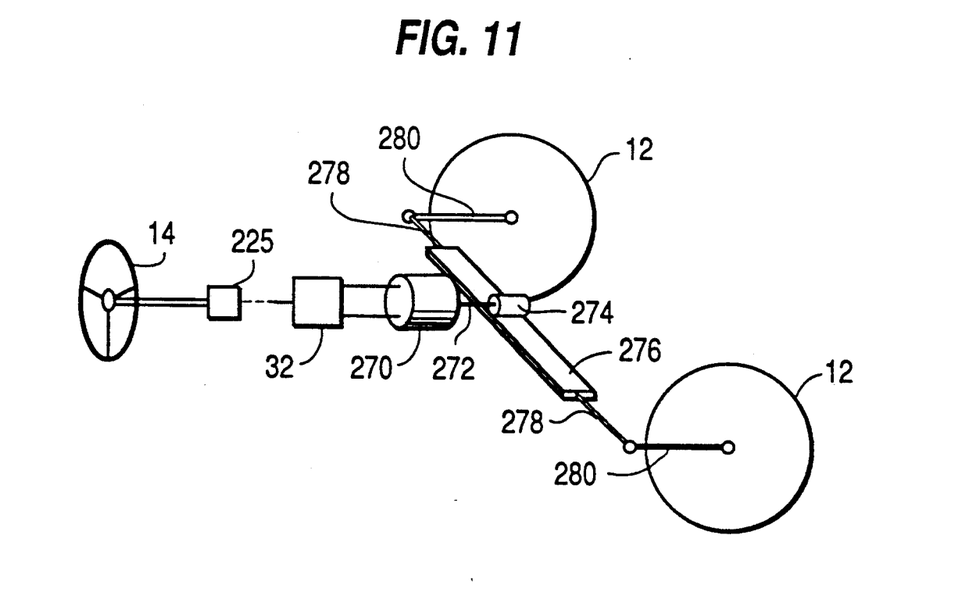
FIG. 11 is a schematic perspective view of a third embodiment of a steering mechanism.

FIG. 11 depicts a third preferred embodiment of the steering mechanism wherein there is no mechanical connection between the steering wheel 14 and the steerable wheels 12. Rather, the rack and pinion are controlled solely by electrical signals from the controller 32. The controller 32 is electrically connected to an electric motor 270, the output shaft 272 of which is connected to a pinion 274. The pinion meshes with the teeth of a rack 276, the ends of which are connected to tie rods 278. The tie rods 278 are connected to steering arms 280.

In operation, rotation of the steering wheel 14 results in a signal being generated by the steering wheel angle sensor 225. That signal is supplied to the controller in the same fashion as disclosed in connection with FIG. 3. Thus, whenever the steering wheel is turned, the controller will deliver a control signal to the motor 70 for turning the steerable wheels 12 by an amount which avoids an appreciable oversteer or understeer.

Figure 12:
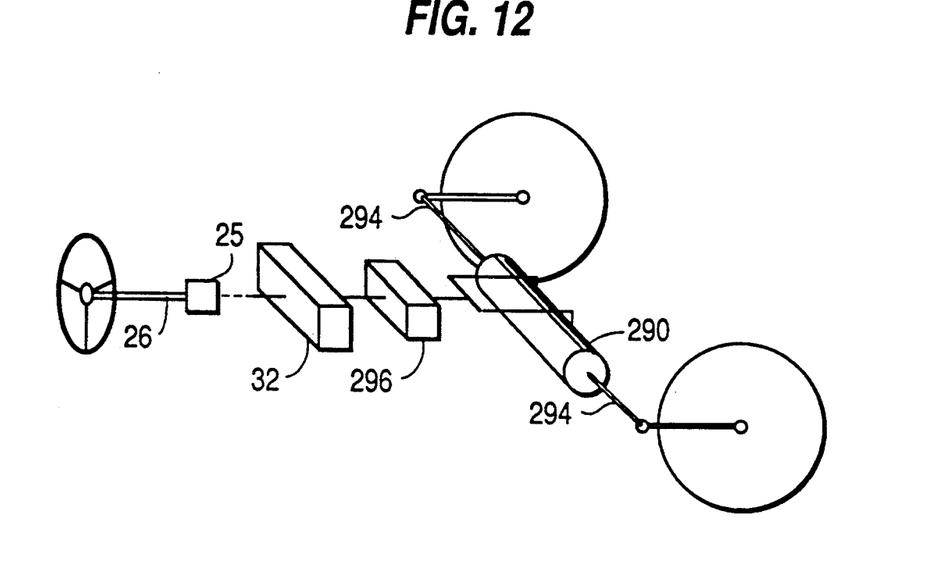
FIG. 12 is a schematic perspective view of a fourth embodiment of a steering mechanism.
Figure 13:
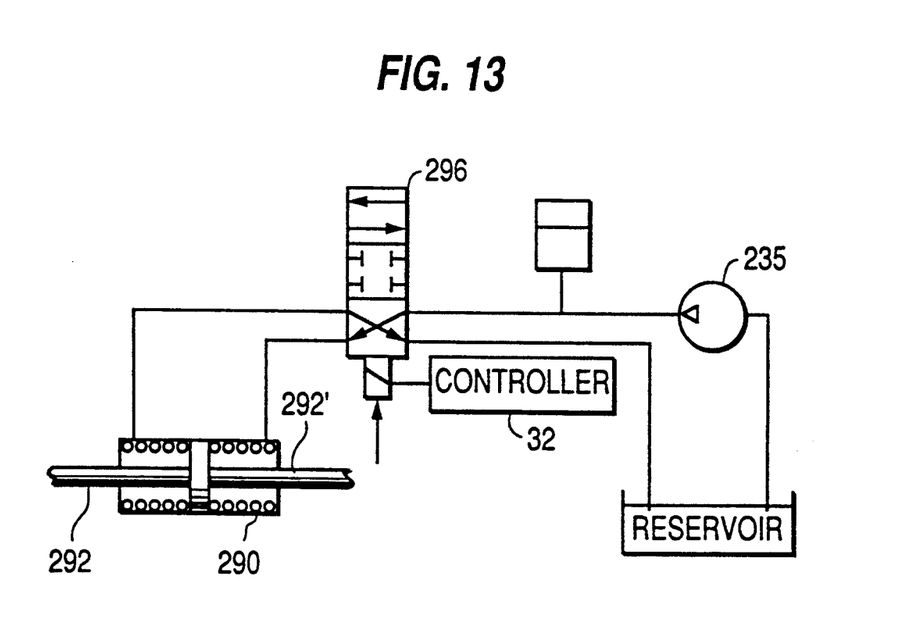
FIG. 13 is a schematic view of a portion of the steering mechanism of FIG. 11.

FIGS. 12 and 13 depict a fourth preferred embodiment of a steering mechanism which is a variant of that described above in connection with FIG. 11 in that the controller 32 controls a fluid mechanism similar to that described above in connection with FIGS. 6 and 7. That is, a fluid cylinder 290 has piston rods 292, 292' connected to tie rods 294. The output signal from the controller 32 is delivered to a three-way solenoid valve 296 to cause pressurized fluid to be conducted from a pump 295 to the fluid cylinder 290 to steer the steerable wheels 12.

Figure 2:
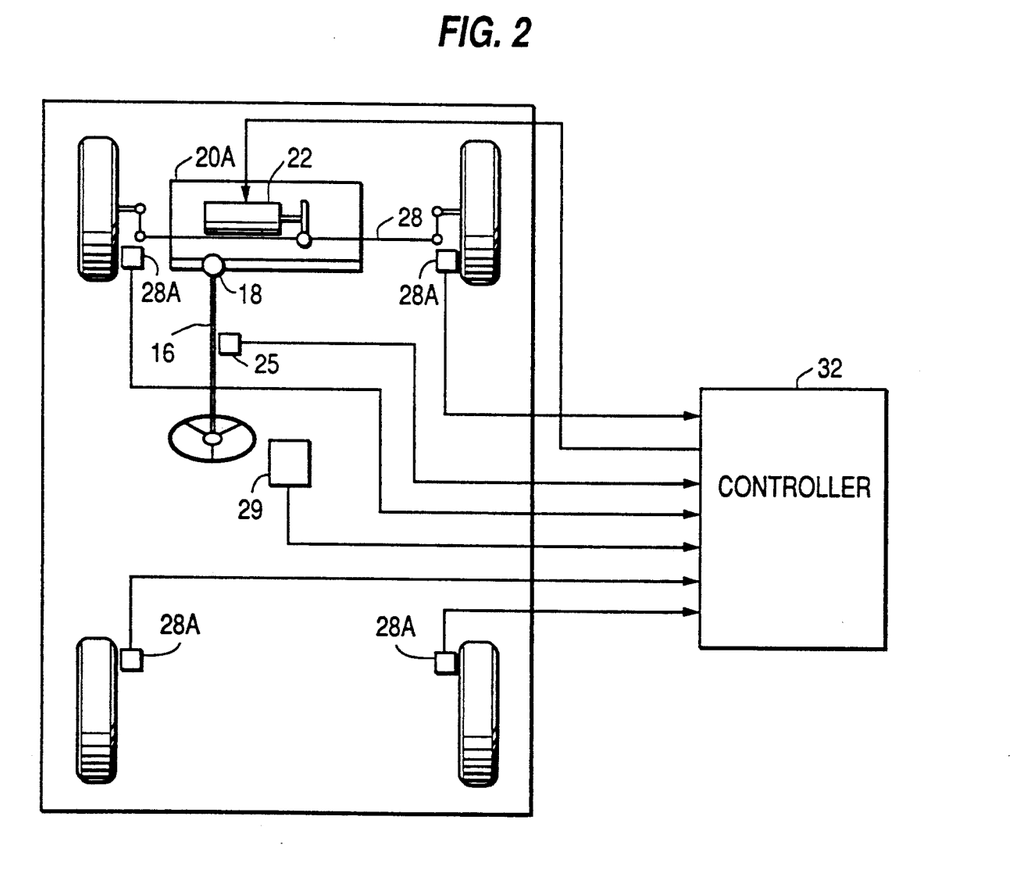
FIG. 2 is a schematic diagram of a first embodiment of a system for controlling the steering mechanism.
Figure 14:
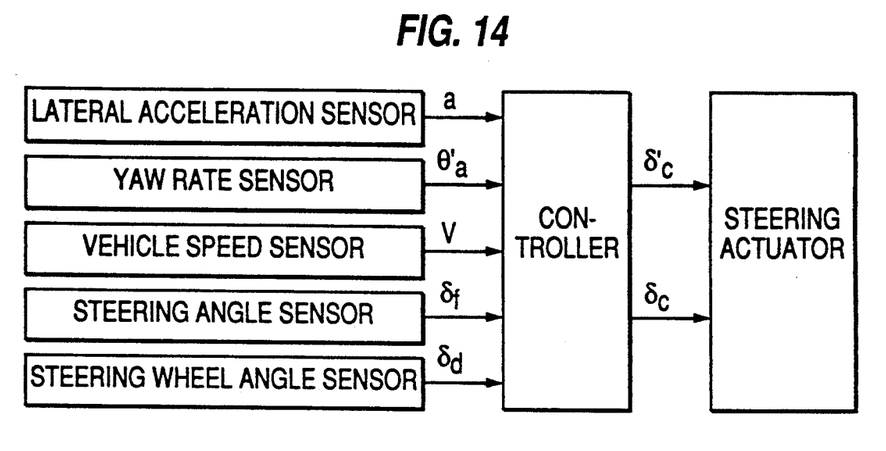
FIG. 14 is a schematic diagram showing a system for controlling the steering mechanism according to the invention.

FIG. 14 is an overall block diagram illustrating an alternative technique for controlling the steering mechanisms. Lateral acceleration a, yaw rate $\theta'_a$, vehicle speed V, steering angle of the steerable wheels $\delta_f$ and steering wheel angle $\delta_d$ are detected as described above, for example, by front and rear lateral acceleration sensors 40 and 42 shown in FIG. 4, gyro 29, and vehicle speed sensors 28A, shown in FIG. 2, steering wheel angle sensor 25 shown in FIG. 2, and the combination of potentiometers 150 and 160 shown in FIG. 8, respectively, with potentiometer 160 also capable of outputting the steering wheel angle. The detected information is provided to controller 32, which outputs a signal representing a desired steering control angle $\delta_c$ and steering control rate $\delta'_c$ to the steering mechanism. That is, $\delta_c$ represents the degree to which the angle of the steerable wheels is to be changed, and $\delta'_c$ represents the rate of change of the angle.

Figure 15:
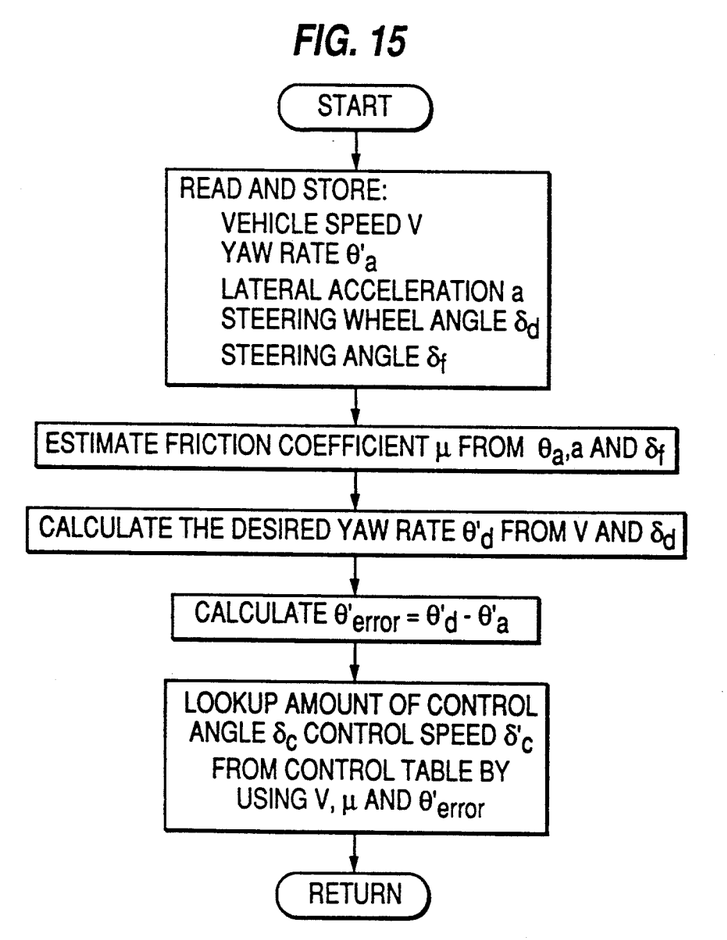
FIG. 15 is a flowchart showing the operation of the system shown in FIG. 14.

With further reference to FIG. 15, a flowchart for providing the control according to FIG. 14 is shown. As in the above discussed embodiments the vehicle speed V, actual yaw rate $\theta'_a$, lateral acceleration a, steering wheel angle $\delta_d$ and steering angle $\delta_f$ are detected. Thereafter, controller 32 estimates an appropriate friction coefficient $\mu$ from the detected yaw rate $\theta'_a$, lateral acceleration a and steering angle $\delta_f$ by reference to an internal lookup table which stores values of friction coefficient $\mu$ as a function of the the detected yaw rate $\theta'_a$, lateral acceleration a and steering angle $\delta_f$. Therefore, in the embodiment of FIG. 14-15, conditions external to the vehicle may be taken into account since the estimated friction coefficient depends on the actual vehicle performance. For example, by estimating the friction coefficient based on the actual yaw rate, lateral acceleration and steering angle, external parameters such as a slippery road surface which will effect the actual yaw rate and lateral acceleration may be taken into account in providing adaptive control.

Thereafter, the desired yaw rate $\theta'_d$, is calculated from velocity V and steering wheel angle $\delta_d$, from the equation disclosed in FIG. 3. The difference $\theta'_{error}$ of $\theta'_d - \theta'_a$ is calculated. Control angle $\delta_c$ and control rate $\delta'_c$ are calculated from vehicle speed V, friction coefficient $\mu$, and $\theta'_{error}$ by controller 32 using a lookup table. That is, appropriate values for the control angle and the control rate for given values of the vehicle speed, estimated friction coefficient and steering error are stored in controller 32. The control rate and angle are outputted to the steering mechanism which executes the commands, and the process is repeated. As with the earlier embodiments, control of the steering is provided so as to cause the actual yaw rate to become equal to the desired yaw rate. However, since the vehicle speed and estimated friction coefficient are taken into account in calculating the control angle and rate, in addition to the difference between the desired and actual yaw rates as in the earlier embodiments, stability augmentation is effected more efficiently. That is, the actual and desired yaw rates become equal more quickly.

Figure 16:
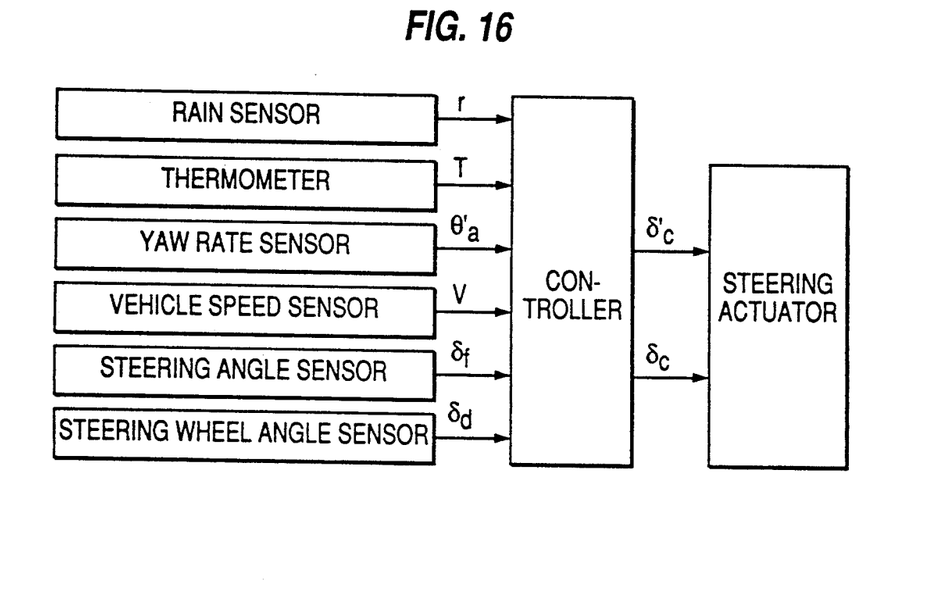
FIG. 16 is a schematic diagram showing an alternative system for controlling the steering mechanism according to the invention.

With reference to the block diagram of FIG. 16, an embodiment in which external environmental conditions are directly measured and utilized to provide proper augmented control is shown. In particular, a rain sensor for measuring precipitation and a thermometer for measuring temperature are mounted on the vehicle at an appropriate location. The thermometer and rain sensor are conventional. In addition, the actual yaw rate, vehicle speed, steering angle and steering wheel angle are measured or calculated as disclosed above. Once again, a desired control angle $\delta_c$ and control rate $\delta'_c$ are outputted to the steering mechanism.

Figure 17:
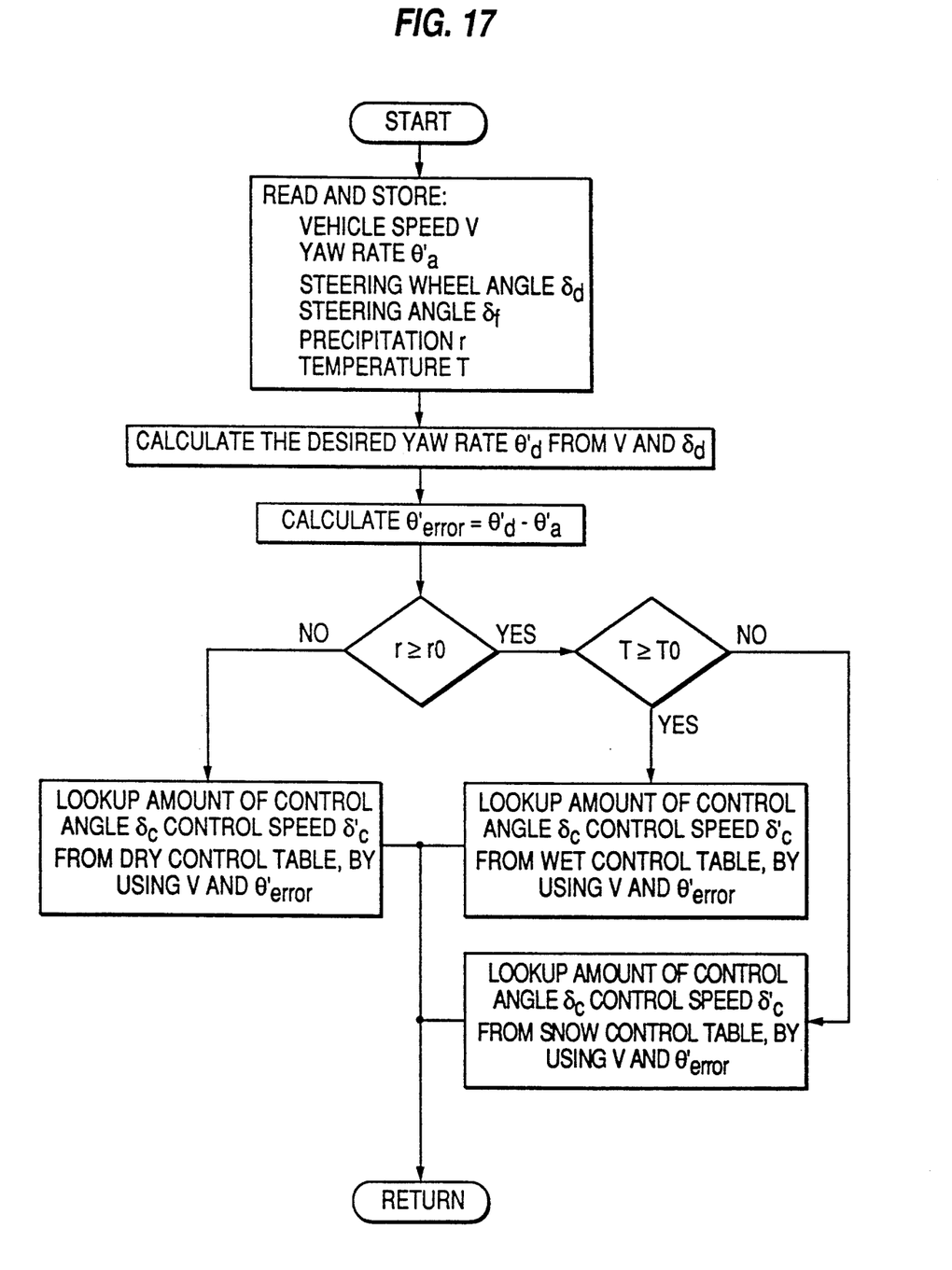
FIG. 17 is a flowchart showing the operation of the system shown in FIG. 16.

With reference to FIG. 17, a flow chart for providing the control according to FIG. 16 is disclosed. The vehicle speed V, actual yaw rate $\theta'_a$, steering wheel angle $\delta_d$, steering angle $\delta_f$, precipitation r, and temperature T are all measured. Thereafter, controller 32 calculates a desired yaw rate $\theta'_d$ from speed V and steering wheel angle $\delta_d$, as disclosed with reference to FIG. 3. The difference $\theta'_{error}$ between the calculated desired yaw rate $\theta'_d$ and the measured actual yaw rate $\theta'_a$ is also calculated.

Figure 18:
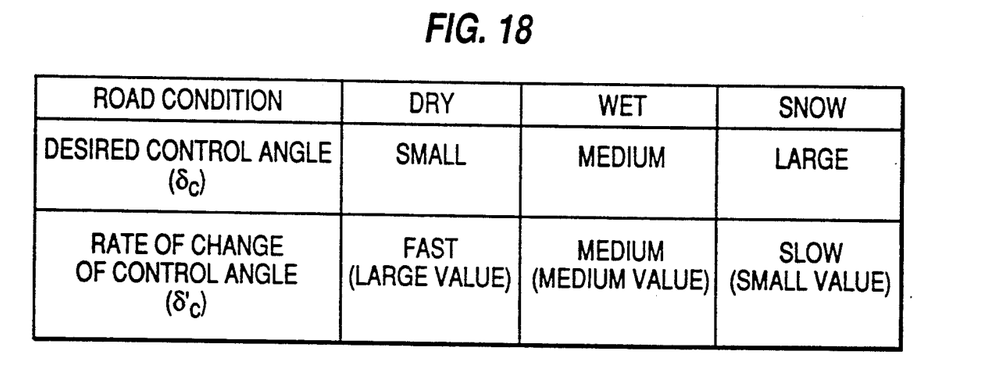
FIG. 18 is a block diagram showing the different range of control angles and control rates which prevail under different external environmental conditions.

At this point, the controller applies adaptive control by determining the external conditions of the road in a two step process. First, the amount of precipitation r is compared to a predetermined threshold value $r_0$. If $r < r_0$, then the controller determines that the road surface is dry. Thereafter, the amount of control angle $\delta_c$ and the control rate $\delta'_c$ are calculated from speed V and $\theta'_{error}$ with reference to a "Dry Condition Control Look-up Table". As shown in FIG. 18, in general, for dry road conditions, the control angle will be relatively small but will be executed at a relatively fast rate, since the risk of skidding or sliding is small and the amount of corrective control needed will be little. The actual values of control angle and rate will depend upon the desired and actual yaw rates, and are predetermined so as to cause the two yaw rates to become equal. These values are stored in the table. Under dry conditions, the second step is not needed and the sequence of steps is repeated.

However, if $r \geq r_0$, then the controller judges that the road is covered by precipitation. A second step is performed in which the controller must first determine whether the road is wet, or if icy or snowy conditions prevail. Therefore, controller 32 compares the measured temperature T with the threshold temperature $T_0$. If $T \geq T_0$, then the roads are wet but are not icy or snowy since the temperature is above the threshold amount, for example, 0° C., and controller 32 utilizes a "Wet Condition Control Look-up Table" to determine the control angle $\delta_c$ and the control rate $\delta'_c$ from speed V and $\theta'_{error}$. As shown in FIG. 18, in general, for wet road conditions, the control angle will be medium, and will be executed at a medium rate, since the risk of skidding is increased, and the amount of corrective control needed is increased. Finally, if $T < T_0$, then the roads are icy or snowy and controller 32 utilizes a "Snowy or Icy Condition Control Look-up Table" to determine the control angle $\delta_c$ and the control rate $\delta'_c$ from speed V and $\theta'_{error}$. As shown in FIG. 18, in general, for snowy or icy road conditions, the control angle will be relatively large and will be executed at a relatively slow rate, since the risk of sliding and the amount of corrective control needed are both increased. As in the dry road situation, the actual values of control angle and rate will depend upon the desired and actual yaw rates, and are predetermined so as to cause the two yaw rates to become equal.

In the embodiment of FIGS. 16-18, as with the embodiment of FIG. 3, the vehicle is steered so as to cause the actual and desired yaw rates to become equal. That is, in each of the three above-discussed situations, dry roads, wet roads, or icy or snowy roads, control is repeated until the actual and desired yaw rates are equal. Of course, a given desired yaw rate and vehicle speed will correspond to a different control angle and rate, depending upon which control table is used. Thus, since the external precipitation and temperature are taken into account in determining the degree of steering control which is provided, the effectiveness of the control is increased, and the vehicle will be more quickly steered on the desired course.

Although the invention has been described in connection with preferred embodiments thereof, it will be appreciated by those skilled in the art that additions, substitutions, modifications, and deletions not specifically described, may be made without departing from the spirit and scope of the invention as defined in the appended claims.

I claim:

1. A method for providing adaptive control to a vehicle having steerable wheels, said method including the steps of:
   detecting and storing values for the vehicle speed, vehicle yaw rate, lateral acceleration, steering wheel angle, and steering angle of the steerable wheels;
   estimating a friction coefficient between the vehicle and the road surface as a function of the yaw rate, lateral acceleration and steering angle;
   calculating a desired yaw rate for the vehicle based on the detected vehicle speed and steering angle;
   calculating the difference between the desired yaw rate and the detected yaw rate;
   determining the proper amount of control angle to be applied to the steerable wheels and the rate with which the control angle is to be implemented based upon the vehicle speed, the estimated frictional coefficient and the difference between the desired yaw rate and the detected yaw rate; and
   applying the control angle to the steerable wheels at the appropriate rate to steer the vehicle so as to cause the detected yaw rate to be substantially equal to the desired yaw rate.

2. The method recited in claim 1, said step of determining the proper amount of control angle and control rate comprising utilizing a look-up table of stored values.

3. A method for providing adaptive control to a vehicle having steerable wheels, said method including the steps of:
   detecting and storing values for the vehicle speed, vehicle yaw rate, steering wheel angle, steering angle, and environmental precipitation;
   calculating a desired yaw rate for the vehicle based upon the detected vehicle speed and steering wheel angle;
   calculating the difference between the desired yaw rate and the detected yaw rate;
   comparing the detected environmental precipitation with a predetermined threshold precipitation value;
   determining the proper amount of control angle to be applied to the steerable wheels of the vehicle and the rate with which the control angle is to be implemented based upon the vehicle speed, the difference between the desired yaw rate and the detected yaw rate and whether the detected precipitation is greater than the threshold precipitation; and
   applying the control angle at the appropriate rate to steer the vehicle so as to cause the detected yaw rate to be substantially equal to the desired yaw rate.

4. The method recited in claim 3, said step of determining the proper amount of control angle and rate comprising utilizing one of a plurality of look-up tables of stored values to make the determination based upon the speed and difference between the desired and actual yaw rates, the table selected based upon whether the detected precipitation is greater than or equal to the threshold precipitation.

5. The method recited in claim 3:
   said detecting and storing step further comprising detecting and storing the environmental temperature;
   said comparing step further comprising comparing the detected temperature with a threshold temperature;
   said determining step further based upon whether the detected temperature is greater than or equal to the threshold temperature.

6. The method recited in claim 5:
   said step of determining the proper amount of control angle and speed comprising utilizing one of a plurality of look-up tables of stored values to make the determination based upon the speed and difference between the desired and actual yaw rates, wherein a first table is utilized if the detected precipitation is less than the threshold precipitation, a second table is utilized when the detected precipitation is greater than or equal to the threshold precipitation and the detected temperature is greater than or equal to the threshold temperature, and a third table is utilized when the detected precipitation is greater than or equal to the threshold precipitation and the detected temperature is less than the threshold temperature.

7. An apparatus for maintaining steering stability of a moving vehicle comprising:
   steerable wheels;
   steering means for steering said steerable wheels;
   detecting means for detecting values for the vehicle speed, vehicle yaw rate, vehicle lateral acceleration, steering wheel angle, and steering angle of said steerable wheels;
   control means for estimating a friction coefficient between the vehicle and the road surface as a function of the detected yaw rate, lateral acceleration and steering angle, said control means for calculating a desired yaw rate for the vehicle based on the detected vehicle speed and steering wheel angle, said control means for calculating the difference between the desired yaw rate and the detected yaw rate, said control means for determining the proper amount of additional steering control angle for said steerable wheels of the vehicle and the rate with which the control angle is to be implemented based on the vehicle speed, estimated frictional coefficient and the difference between the desired yaw rate and the detected yaw rate so as to cause the detected yaw rate to become substantially equal to the desired yaw rate, and outputting a signal indicative of the proper control angle and control rate, said control means operably connected to said steering means, said steering means actuated in response to the signal indicative of the proper control angle and control rate to steer the steerable wheels.

8. The apparatus recited in claim 7, said control means including a look-up table of stored values of the friction coefficient, wherein said control means estimates the friction coefficient by reference to said look-up table.

9. An apparatus for maintaining steering stability of a moving vehicle comprising:
   steerable wheels;
   steering means for steering said steerable wheels;
   detecting means for detecting values for the vehicle speed, vehicle yaw rate, vehicle lateral acceleration, steering wheel angle, steering angle of said steerable wheels and environmental precipitation;

control means for calculating a desired yaw rate for the vehicle based on the detected vehicle speed and steering wheel angle, said control means for calculating the difference between the desired yaw rate and the detected yaw rate, said control means for comparing the detected environmental precipitation with a predetermined threshold precipitation value, said control means for determining the proper amount of additional steering control angle for said steerable wheels of the vehicle and the rate with which the control angle is to be implemented based upon the vehicle speed, whether the detected environmental precipitation is greater than the predetermined threshold precipitation and the difference between the desired yaw rate and the detected yaw rate so as to cause the detected yaw rate to become substantially equal to the desired yaw rate, and outputting a signal indicative of the proper control angle and control rate, said control means operably connected to said steering means, said steering means actuated in response to the outputted signal to steer the steerable wheels.

10. The apparatus recited in claim 9, said control means comprising a plurality of look-up tables of stored values of the steering control angle and rate, wherein said control means determines the steering control angle and rate by reference to one of said look-up tables, said table selected on the basis of whether the detected precipitation exceeds a threshold value.

11. The apparatus recited in claim 9, said detecting means further for detecting and storing the environmental temperature, said control means determining the proper amount of additional steering control angle for said steerable wheels of the vehicle and the speed with which the control angle is to be implemented further based upon the detected temperature.

12. The apparatus recited in claim 11, said control means comprising a plurality of look-up tables of stored values of the steering control angle and rate, said control means determining the steering control angle and rate by reference to one of said look-up tables, wherein a first table is utilized if the detected precipitation is less than a threshold precipitation, a second table is utilized when the detected precipitation is greater than or equal to a threshold precipitation and the detected temperature is greater than or equal to a threshold temperature, and a third table is utilized when the detected precipitation is greater than or equal to a threshold precipitation and the detected temperature is less than a threshold temperature.

* * * * *